(12) United States Patent
Brandt et al.

(10) Patent No.: US 7,593,207 B2
(45) Date of Patent: Sep. 22, 2009

(54) GAS-INSULATED SWITCHGEAR ASSEMBLY OR COMPONENT OF A GAS-INSULATED SWITCHGEAR ASSEMBLY HAVING AN OUTDOOR BUSHING

(75) Inventors: Jorn Brandt, Mannheim (DE); Christian Ries, Munster (DE); Nils Hardt, Hanau (DE)

(73) Assignee: ABB Technology AG, Zurich (CH)

( * ) Notice: Subject to any disclaimer, the term of this patent is extended or adjusted under 35 U.S.C. 154(b) by 414 days.

(21) Appl. No.: 10/532,314

(22) PCT Filed: Jan. 16, 2004

(86) PCT No.: PCT/EP2004/000294

§ 371 (c)(1),
(2), (4) Date: May 3, 2006

(87) PCT Pub. No.: WO2004/066463

PCT Pub. Date: Aug. 5, 2004

(65) Prior Publication Data

US 2006/0237393 A1 Oct. 26, 2006

(30) Foreign Application Priority Data

Jan. 22, 2003 (DE) ................. 103 02 210

(51) Int. Cl.
*H02H 9/00* (2006.01)
(52) U.S. Cl. ..................................... 361/118
(58) Field of Classification Search .................. 361/118
See application file for complete search history.

(56) References Cited

U.S. PATENT DOCUMENTS

| 1,784,340 A | 12/1930 | Conant |
| 2,586,354 A | 2/1952 | Leonard et al. |
| 2,639,346 A | 5/1953 | Yonkers |
| 2,866,135 A | 12/1958 | Cunningham |
| 2,993,146 A | 7/1961 | Winter |
| 3,037,152 A | 5/1962 | Bergstrom |
| 3,249,815 A | 5/1966 | Henry |
| 3,777,218 A | 12/1973 | Kassler |
| 3,787,711 A | 1/1974 | Bright |
| 4,063,298 A | 12/1977 | Tornetta et al. |
| 4,320,432 A | 3/1982 | Duenke |
| 4,360,849 A | 11/1982 | Harris et al. |

(Continued)

FOREIGN PATENT DOCUMENTS

DE 1007401 B 5/1957

(Continued)

*Primary Examiner*—Stephen W Jackson
(74) *Attorney, Agent, or Firm*—Buchanan Ingersoll & Rooney PC

(57) ABSTRACT

A gas-insulated switchgear assembly (1) or component of a gas-insulated switchgear assembly is proposed which has an outdoor bushing (6) through which at least one high voltage-carrying conductor (7) is passed. A surge arrester (8) is arranged essentially parallel to the outdoor bushing (6) and is connected to the high voltage-carrying conductor (7) and/or to the top part of the outdoor bushing (6) via a high voltage-side connection piece (9) and to the foot part of the outdoor bushing (6) and/or to the housing of the gas-insulated switchgear assembly or the component of the gas-insulated switchgear assembly via a housing-side connection piece (10).

8 Claims, 1 Drawing Sheet

U.S. PATENT DOCUMENTS

Figure 1:
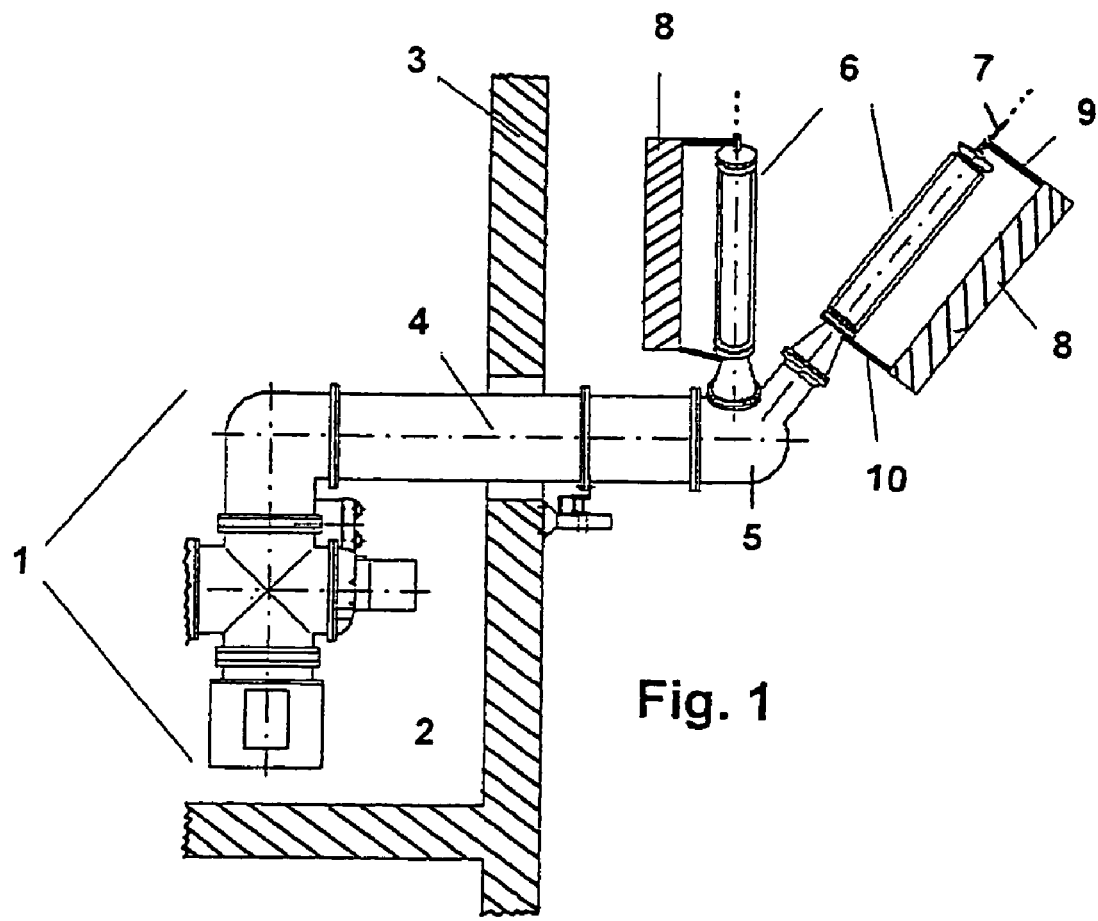

| | | | |
|---|---|---|---|
| 4,460,937 A * | 7/1984 | Kamata et al. | 361/604 |
| 4,587,589 A | 5/1986 | Marek | |
| 4,803,436 A | 2/1989 | Kresge et al. | |
| 4,810,840 A | 3/1989 | Okuno | |
| 5,712,756 A | 1/1998 | Ozawa et al. | |
| 5,912,792 A * | 6/1999 | Shirakawa et al. | 361/40 |

FOREIGN PATENT DOCUMENTS

| | | |
|---|---|---|
| DE | 1063699 B | 8/1959 |
| DE | 1104040 B | 4/1961 |
| DE | 2149435 A1 | 4/1973 |
| DE | 3408216 A1 | 9/1984 |
| DE | 4408818 C1 | 5/1995 |
| DE | 42 41 952 C2 | 3/1996 |
| DE | 196 47 736 C1 | 4/1998 |
| DE | 199 06 237 A1 | 10/2000 |
| DE | 10014679 A1 | 10/2001 |
| DE | 100 20 129 C1 | 11/2001 |
| EP | 0224074 A2 | 6/1987 |
| EP | 0259731 A2 | 3/1988 |
| EP | 0510019 B1 | 8/1995 |
| EP | 1 030 423 A2 | 8/2000 |
| GB | 424846 | 9/1933 |
| JP | 03107314 A | 5/1991 |
| WO | 99/50942 | 10/1999 |

* cited by examiner

GAS-INSULATED SWITCHGEAR ASSEMBLY OR COMPONENT OF A GAS-INSULATED SWITCHGEAR ASSEMBLY HAVING AN OUTDOOR BUSHING

The invention relates to a gas-insulated switchgear assembly having an outdoor bushing or to a component of a gas-insulated switchgear assembly.

DE 100 20 129 C1 discloses an assembly having a surge arrester for a high-voltage system, comprising an isolator which is physically combined with a surge arrester comprising resistive elements. The isolator is in this case in the form of a composite having a fixed body and a cast elastomer encapsulation, the surge arrester being embedded in the potting compound of the elastomer encapsulation.

DE 196 47 736 C1 discloses a high-voltage circuit breaker having a hollow dielectric support, in whose interior a drive rod extends. The interior between the drive rod and the inner wall of the dielectric support is filled at least partially with dissipation elements. For example, dissipation elements in the form of annular discs are stacked from the flange lying at earth potential up to the high voltage-side connection to the flange of the circuit breaker. Two or more stacks of dissipation elements may also be conductively connected in each case, on the one hand, to the high-voltage potential and, on the other hand, to the earth potential.

The invention is based on the object of specifying an effective and inexpensive means of providing overvoltage protection for a gas-insulated switchgear assembly having an outdoor bushing or for a component of a gas-insulated switchgear assembly having an outdoor bushing.

The advantages which can be achieved with the invention are in particular the fact that a separate frame to which the surge arrester is fitted is no longer required, which results, on the one hand, in cost advantages (production costs, assembly costs) and, on the other hand, in a reduction in the amount of space required.

Further advantages are explained in the description below.

Advantageous refinements of the invention are characterized in the subclaims.

Figure 2:
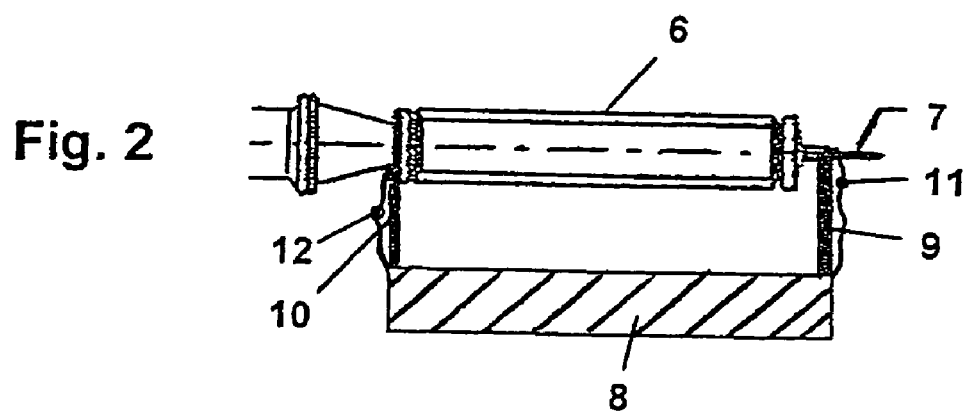

The invention is explained below with reference to the exemplary embodiments illustrated in the drawing, in which:

FIG. 1 shows a gas-insulated switchgear assembly having a wall bushing and an adjoining outdoor bushing, and FIG. 2 shows an alternative means of fixing the surge arrester.

FIG. 1 shows a gas-insulated switchgear assembly having a wall bushing and an adjoining outdoor bushing. The gas-insulated switchgear assembly 1 is fitted in a building 2 and is thus surrounded by building walls, a building floor and a building ceiling. For the purpose of connecting operating means outdoors, for example transformers, overhead lines and other operating means, a wall bushing 4 is required which is led outside from the building interior via an opening in a building wall 3. This wall bushing 4 is generally in the form of a tube having a metallic shield connected to earth potential.

Fixed to the foot 5, which is arranged outside the building 2, of the wall bushing 4 are two or more (depending on the number of voltage-carrying conductors led through the wall bushing 4 or phases) tubular outdoor bushings 6 having their in each case first end sides (foot parts). The respective second end sides (top parts) of the outdoor bushings 6 are interrupted by the conductors 7, which extend within the wall bushing 4, carry a high voltage and serve the purpose of connecting operating means, for example a transformer, or overhead lines.

For the purpose of protecting the gas-insulated switchgear assembly 1 against, for example, overvoltages caused by lightning, a surge arrester 8 is arranged approximately parallel to each outdoor bushing 6 and is connected to the conductor 7 via a high voltage-side connection piece 9 and to the foot 5, which is connected to earth potential, of the wall bushing 4 via a housing-side connection piece 10. These two connection pieces 9, 10 are sufficiently mechanically robust to bear the surge arresters 8. Metal oxide arresters are preferably used as the surge arresters 8.

According to the first exemplary embodiment shown in FIG. 1, the connection pieces 9, 10 between the conductor 7 on the top part of the outdoor bushing 6 and the surge arrester 8 and, respectively, between the foot 5 of the wall bushing 4 on the foot part of the outdoor bushing 6 and the surge arrester 8 are made of an electrically highly conductive metal such that they are at the same time electrical and mechanical connecting elements which are naturally designed such that the wall bushing 4 and the foot 5 or the outdoor bushings 6 are not mechanically overloaded.

FIG. 2 shows an alternative means of fixing the surge arrester. In this second exemplary embodiment, the connection pieces 9, 10 between the top part of the outdoor bushing 6 and the surge arrester 8 and, respectively, between the foot part of the outdoor bushing 6 and the surge arrester 8 are made of an electrically poorly conductive or nonconductive material or metal, with the result that they are merely mechanical connecting elements. The electrical connections between the conductor 7 and the surge arrester 8 and between the earth potential of the wall bushing 4/foot 5 and the surge arrester 8 are made by separate connecting conductors 11 and 12, respectively, which are formed from a rigid or flexible, electrically highly conductive material and extend, for example, parallel to the connection pieces 9 and 10, respectively.

Even though in the above-explained exemplary embodiment a gas-insulated switchgear assembly having a wall bushing and an adjoining outdoor bushing is described, the invention is not limited to this but may also advantageously be applied for the following configurations:

Gas-insulated switchgear assembly installed outdoors (in this application too, outdoor bushings are used, on which the surge arresters can be mounted; the metallic housing of the gas-insulated switchgear assembly is suitable to be fixed to the housing-side connection piece of the outdoor bushing).

Applications which use components of gas-insulated switchgear assemblies (for example circuit breakers+ isolating switches in a gas-insulated housing) together with outdoor bushings (the metallic housing of the component of the gas-insulated switchgear assembly is suitable for being fixed to the housing-side connection piece of the outdoor bushing).

Dead tank breakers (circuit breakers in a gas-insulated, earthed metal housing; the metallic housing is highly suitable for being fixed to the housing-side connection piece of the outdoor bushing).

The invention claimed is:

1. Gas-insulated switchgear assembly or component of a gas-insulated switchgear assembly arranged inside of a building, comprising:

an outdoor bushing arranged outside of the building through which at least one high voltage-carrying conductor can be passed;

a surge arrester arranged essentially parallel to the outdoor bushing and connected to the high voltage-carrying conductor and/or to the top part of the outdoor bushing via a high voltage-side connection piece and to the foot part of the outdoor bushing and/or to the housing of the gas-insulated switchgear assembly or the component of the gas-insulated switchgear assembly via a housing-side connection piece.

2. Gas-insulated switchgear assembly according to claim 1, wherein, in the case of a gas-insulated switchgear assembly having a wall bushing and an adjoining outdoor bushing, the surge arrester is alternatively connected to the foot of the wall bushing via the housing-side connection piece.

3. Gas-insulated switchgear assembly according to claim 1, wherein the high voltage-side connection piece and/or the housing-side connection piece are made of an electrically highly conductive metal, with the result that they are at the same time electrical and mechanical connecting elements.

4. Gas-insulated switchgear assembly according to claim 1, wherein the high voltage-side connection piece and/or housing-side connection piece are made of an electrically poorly conductive or nonconductive material, with the result that they are only mechanical connecting elements, and in that the electrical connections between the conductor and the surge arrester and between the earth potential of the foot of the wall bushing or the housing of the gas-insulated switchgear assembly or the component of the gas-insulated switchgear assembly and the surge arrester take place using separate connecting conductors which are formed from an electrically highly conductive material.

5. Gas-insulated switchgear assembly according to claim 4, wherein the separate connecting conductors are designed to be rigid.

6. Gas-insulated switchgear assembly according to claim 4, wherein the separate connecting conductors are designed to be flexible.

7. In combination, an arrangement according to claim 1 and a dead tank breaker.

8. Gas-insulated switchgear assembly or component of a gas-insulated switchgear assembly comprising:
an outdoor bushing through which at least one high voltage-carrying conductor can be passed;
a surge arrester arranged essentially parallel to the outdoor bushing and connected to the high voltage-carrying conductor and/or to the top part of the outdoor bushing via a high voltage-side connection piece and to the foot part of the outdoor bushing and/or to the housing of the gas-insulated switchgear assembly or the component of the gas-insulated switchgear assembly via a housing-side connection piece wherein the high voltage-side connection piece and/or housing-side connection piece are made of an electrically poorly conductive or nonconductive material, with the result that they are only mechanical connecting elements, and in that the electrical connections between the conductor and the surge arrester and between the earth potential of the foot of the wall bushing or the housing of the gas-insulated switchgear assembly or the component of the gas-insulated switchgear assembly and the surge arrester take place using separate connecting conductors which are formed from an electrically highly conductive material.

* * * * *